(12) United States Patent
Wang et al.

(10) Patent No.: US 7,945,344 B2
(45) Date of Patent: May 17, 2011

(54) COMPUTATIONAL METHOD FOR DESIGN AND MANUFACTURE OF ELECTROCHEMICAL SYSTEMS

(75) Inventors: Chia-Wei Wang, Ann Arbor, MI (US); Fabio Albano, Canton, MI (US); Ann Marie Sastry, Ann Arbor, MI (US)

(73) Assignee: SAKT13, Inc., Ann Arbor, MI (US)

( * ) Notice: Subject to any disclaimer, the term of this patent is extended or adjusted under 35 U.S.C. 154(b) by 135 days.

(21) Appl. No.: 12/484,959

(22) Filed: Jun. 15, 2009

(65) Prior Publication Data

US 2009/0326696 A1 Dec. 31, 2009

Related U.S. Application Data

(60) Provisional application No. 61/074,561, filed on Jun. 20, 2008.

(51) Int. Cl.
*H01M 4/36* (2006.01)
*H01M 8/22* (2006.01)
*H01M 8/24* (2006.01)
*H01M 8/10* (2006.01)

(52) U.S. Cl. ........ 700/103; 700/106; 429/405; 429/408; 429/465; 429/479

(58) Field of Classification Search .................. None
See application file for complete search history.

(56) References Cited

U.S. PATENT DOCUMENTS

| | | | | |
|---|---|---|---|---|
| 4,933,889 A * | 6/1990 | Meshkat et al. | ............. | 703/2 |
| 5,367,465 A * | 11/1994 | Tazawa et al. | ............. | 700/98 |
| 5,377,118 A * | 12/1994 | Leon et al. | ............. | 700/182 |
| 5,402,366 A * | 3/1995 | Kihara et al. | ............. | 703/9 |
| 5,453,934 A * | 9/1995 | Taghavi et al. | ............. | 700/182 |
| 5,751,591 A * | 5/1998 | Asada | ............. | 716/115 |
| 6,016,047 A * | 1/2000 | Notten et al. | ............. | 320/137 |
| 6,350,222 B2 * | 2/2002 | Susnjara | ............. | 483/1 |
| 6,402,443 B1 * | 6/2002 | Hoppe | ............. | 409/230 |
| 7,107,193 B1 * | 9/2006 | Hummel et al. | ............. | 703/2 |
| 7,490,710 B1 * | 2/2009 | Weskamp et al. | ............. | 198/345.3 |
| 7,579,112 B2 * | 8/2009 | Chiang et al. | ............. | 429/209 |
| 7,625,198 B2 * | 12/2009 | Lipson et al. | ............. | 425/174 |
| 2002/0169620 A1 * | 11/2002 | Spotnitz et al. | ............. | 705/1 |
| 2006/0156978 A1 * | 7/2006 | Lipson et al. | ............. | 118/708 |
| 2008/0118782 A1 * | 5/2008 | Heller et al. | ............. | 429/2 |

OTHER PUBLICATIONS

International Search Report and Written Opinion of PCT Application No. PCT/US09/47848, dated Aug. 24, 2009, 9 pages total.

(Continued)

*Primary Examiner* — Ramesh B Patel
*Assistant Examiner* — Sunray R Chang
(74) *Attorney, Agent, or Firm* — Richard T. Ogawa; Ogawa P.C.

(57) ABSTRACT

A method for manufacturing an electrochemical cell. The method includes generating spatial information including an anode geometry, a cathode geometry, a separator geometry, and one or more current collector geometries. The method also includes storing the spatial information including the anode geometry, the cathode geometry, the separator geometry, and the one or more current collector geometries into a database structure. In a specific embodiment, the method includes selecting one or more material properties from a plurality of materials and using the one or more material properties with the spatial information in a simulation program. The method includes outputting one or more performance parameters from the simulation program.

16 Claims, 13 Drawing Sheets

OTHER PUBLICATIONS

Aceves et al., "Computer Modeling in the Design and Evaluation of Electric and Hybrid Vehicles" 11th Annual National Educators' Workshop, Los Alamos, New Mexico, Oct. 27-30, 1996; retrieved from the Internet: <<http://www.osti.gov/bridge/servlets/purl/381678-Unwv9F/webviewable/381678.pdf>>, 12 pages total.

Chen et al., "Selection of Conductive Additives in Li-ion Battery Cathodes: A Numerical Study", Journal of the Electrochemical Society, 154(10):A978-A986 (2007).

Wang et al., "Mesoscale Modeling of a Li-Ion Polymer Cell," Journal of the Electrochemical Society, 154(11):A1035-A1047 (2007).

* cited by examiner

COMPUTATIONAL METHOD FOR DESIGN AND MANUFACTURE OF ELECTROCHEMICAL SYSTEMS

CROSS-REFERENCES TO RELATED APPLICATIONS

This application claims the benefit of U.S. Provisional Patent Application No. 61/074,561, filed Jun. 20, 2008, entitled "Computational Method for Design and Manufacture of Electrochemical Systems," the contents of which is hereby incorporated by reference in its entirety.

BACKGROUND OF THE INVENTION

This present invention relates to manufacture of electrochemical cells. More particularly, the present invention provides a method and system for providing a design and using such design for manufacture of three-dimensional elements for three-dimensional electrochemical cells. Merely by way of example, the invention has been provided with use of lithium based cells, but it would be recognized that other materials such as zinc, silver, copper and nickel could be designed in the same or like fashion. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

A typical conventional electrochemical cell, commonly known as a battery, consists of a positive electrode, negative electrode, a separator, an electrolyte, a container, and tabs extending from the electrode and extending through the exterior of the container. Electrochemical cells and batteries are classified as primary (non-rechargeable), and secondary (rechargeable). Upon discharge, anode atoms lose electrons to the external circuitry and they oxidize to ions; at the same time ions at the cathode gain electrons and ions from the external circuitry and electrolyte, respectively. Upon charge, the reverse occurs: ions at anode regain electrons and reduce back to atoms, while atoms at cathode lose electrons and ions to the external circuitry and electrolyte, respectively. During these processes, ions are transported through the electrolyte. Design and manufacturing of facile, accessible pathways for both electron and ions are important factors in achieving high rate performance and high specific and gravimetric energy in electrochemical cells.

Conventional batteries generally have one of three form factors: cylindrical, prismatic, and button cells. The form factors influence electrode design. The form factors also affect cell performance characteristics, including capacity and rate capability, because they increase internal electrical resistance and resistance to heat dissipation. Electrodes are commonly manufactured as one of three basic types, wherein 1) cathode and anode comprise concentric cylinders (cylindrical configuration), 2) cathode, anode and separator are spirally wound in a "jelly roll" configuration (also a cylindrical configuration), or 3) cathode and anode are manufactured in a flat-plate configuration (prismatic configuration). The concentric cylinders design generally has higher energy and capacity, because it generally maximizes the amount of active material packed inside the cell. However, the jelly roll and flat plate design frequently offer higher rate performance, because of higher surface areas. In general, high aspect-ratio (length-to-diameter ratio) cylindrical cells generally offer lower internal resistance and better rate capabilities than lower aspect-ratio cylindrical cells. Higher discharge rate capability is generally a result of higher surface area-to-volume ratios.

Conventional manufacturing processes for electrodes involve multiple manufacturing processes. That is, conventional manufacturing of electrodes include casting a paste of mixtures of active materials, conductive additives, binder, and solvent onto a metal substrate to form an electrode. Next, the paste of mixtures making up the electrode is dried in a high temperature oven or at room temperature. The electrode is laminated to a sufficiently low thickness to assure good contact among the constituent particles. Performance targets for electrochemical cells include adequate specific energy/power and energy/power density, cell and module robustness, safety, aging characteristics, lifetime, thermal behavior, and material/shelf life.

Unfortunately, limitations exist in designing and manufacturing the electrochemical cells. Achieving the performance targets is accomplished through trial and error, which is tedious and time consuming. Often times, cell capacity and chemistry are selected. The quantity of material for the chemistry is selected for the electrode. The material is provided in one of the three configurations. The resulting battery is tested to determine whether the performance targets have been met, which is generally not the case even after repeated trial and error. Single dimensional simulation within the battery is performed. The amount of active materials used in the electrodes is calculated and recalculated based on targeted capacity. Other parameters including electrode thicknesses, electrolyte compositions, and types and concentrations of additives are typically adjusted until cycle-life and safety targets are met. Clearly, a time-consuming, inefficient, and tedious, process!

Several published literature reports attempt to provide systematic and numerical approaches to analyzing conventional batteries. These reports pertain to the amount of active materials, conductive additives, binder and porosity of the electrode, and the degree of compression. A pioneering approached was described in "C.-W. Wang, and A. M. Sastry, Mesoscale Modeling of a Li-Ion Polymer Cell, Journal of the Electrochemical Society," 154 [11] A1035-A1047 (2007), and Y.-H. Chen, C.-W. Wang, G. Liu, X.-Y. Song, V. S. Battaglia, and A. M. Sastry, Selection of Conductive Additives in Li-ion Battery Cathodes: "A Numerical Study, Journal of the Electrochemical Society, 154 [10] A978-A986 (2007)." Although highly successful, such approaches were limited.

Therefore, it is highly desirable to find ways of improving and designing electrochemical cells, which holistically accounts for key manufacturing and performance parameters.

SUMMARY OF THE INVENTION

This present invention relates to manufacture of electrochemical cells. More particularly, the present invention provides a method and system for providing a design and using the design for manufacture of three-dimensional elements for three-dimensional electrochemical cells. Merely by way of example, the invention has been provided with use of lithium based cells, but it would be recognized that other materials such as zinc, silver, copper and nickel could be designed in the same or like fashion. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

Merely by way of example, the invention has been provided using finite element analysis or other suitable techniques, a method of numerical analysis of multiphysics problems, in which partial or whole differential equations are solved simultaneously. These relations include, as a partial list, mechanical properties and responses obtained via equilibrium or dynamic load considerations, thermal properties and temperature distributions obtained via heat transfer methods, cell potential and concentrations of species and their transport properties, obtained via kinetic relations and/or fluid flow modeling, among others. Methods including finite difference methods, boundary element analysis, element-free Galerkin (EFG) or Smoothed Particle Hydrodynamics (SPH) methods may also be used. Some, but not all, of these methods employ meshes, or representations of surfaces and volumes, which are generated via a wide range of methodologies, could also be used. Post-processing of data generated in solution of multi-physics problems is described in general, but can be accomplished as a separate step, using any standard method of mining and presenting data.

In a specific embodiment, an electrochemical cell can be built based on the process of present invention. One or more embodiments of present invention provides a systematic process to manufacturing a three-dimensional electrochemical cell by selecting proper characteristics of the three-dimensional electrochemical cells, so that one or more of its performance parameters will meet the design criteria. The intrinsic characteristics of the electrochemical cells includes particle size, particle spacing, volume fraction, density, composition of cathode/anode/separator/current collector/electrolyte, interfacial interaction of electrolyte/anode or electrolyte/cathode, shape of the cathode/anode/separator/electrolyte, and the types of materials. The performance parameters include lifetime, safety/mechanical/kinetic, thermal, ion concentration, voltage profile, degree of intercalation, degree of achievable capacity under various discharge rate or discharge profile, intercalation-induced stresses, and volume changes that meet the design criteria.

In another embodiment, a conventional electrochemical cell can be improved by modifying one or two factors from the list of particle size, particle spacing, volume fraction, density, composition of cathode/anode/separator/current collector/electrolyte, interfacial interaction of electrolyte/anode or electrolyte/cathode, shape of the cathode/anode/separator/electrolyte, and the types of materials. One or more embodiments of present invention provide a systematic process to evaluate the modification, so that one or two performance parameters meet the design criteria. The performance parameters include lifetime, safety/mechanical/kinetic, thermal, ion concentration, voltage profile, degree of intercalation, degree of achievable capacity under various discharge rate or discharge profile, intercalation-induced stresses, and volume changes.

In yet an alternative specific embodiment, the present invention provides a method for manufacturing an electrochemical cell. The method includes generating spatial information including an anode geometry, a cathode geometry, a separator geometry, and one or more current collector geometries. The method also includes storing the spatial information including the anode geometry, the cathode geometry, the separator geometry, and the one or more current collector geometries into a database structure. In a specific embodiment, the method includes selecting one or more material properties from a plurality of materials and using the one or more material properties with the spatial information in a simulation program. The method includes outputting one or more performance parameters from the simulation program.

Still further, the present invention provides a computer-aided system for processing information related to a three-dimensional electrochemical system comprising an anode, cathode, separator, electrolyte, and current collectors. In a specific embodiment, the system comprises one or more computer readable memories. The one or more computer readable memories include codes. One or more computer codes are for outputting a computer generated relationship between one or more first characteristics referenced against one or more second characteristics for a selected material set for design of three dimensional spatial elements in a three-dimensional electrochemical cell. One or more codes are directed to selecting one or more of the first or second characteristics for the selected material set. One or more codes are directed to processing the one or more selected first or second characteristics to determine whether the one or more first or second characteristics is within one or more predetermined performance parameters. One or more codes are directed to executing a program for processing the one or more first or second characteristics to design the three dimensional electrochemical cell having one or more particle feature sizes of less than 100 microns. Depending upon the embodiment, other codes can also exist to carry out the functionality described herein.

Benefits are achieved over conventional techniques. In one or more embodiments, the present method and system takes an unconventional approach to design an electrochemistry or use of other materials for a selected battery architecture, which is conventionally an ending point and not a starting point for a design process. In a specific embodiment, the present method and system designs an architecture and then determine electrochemistry and other parameters. Accordingly, we have been able to systematically produce a cost effective design and manufacturing process to meet performance targets such as performance, reliability, safety, lifecycle, reclamation and reuse, cost, and other factors. According to the present invention, conventional computer software and hardware can be used for computer aided design of selecting one or more electrochemistries (anode/cathode and electrolyte) for a selected design architecture. In a preferred embodiment, the present method and system can simulate design and processing such as packing in three dimensions, using computer aided hardware and analysis techniques such as mesh generation with irregular geometric objects with memory sizes of 32 gigabyte and greater, and processing speeds of 3 gigahertz and greater. Such irregular shaped objects include, among others, sinusoidal and ellipsoidal. Other benefits include an ability it confers in rational design and combination of multiple materials to produce electrochemical cells, in desired arrangements. These designs, in turn, confer superior properties to designed cells, and elimination of costly-trial and error in construction of prototype cells. Depending upon the specific embodiment, one or more of these benefits may be achieved.

The present invention achieves these benefits and others in the context of known process technology. However, a further understanding of the nature and advantages of the present invention may be realized by reference to the latter portions of the specification and attached drawings.

DETAILED DESCRIPTION OF SPECIFIC EMBODIMENTS

According to the present invention, techniques related to manufacture of electrochemical cells are provided. More particularly, the present invention provides a method and system for providing a design and using the design for manufacture of three-dimensional elements for three-dimensional electrochemical cells. Merely by way of example, the invention has been provided with use of lithium based cells, but it would be recognized that other materials such as zinc, silver, copper and nickel could be designed in the same or like fashion. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles).

Merely by way of example, the invention has been provided using finite element analysis, a method of numerical analysis of multiphysics problems, in which partial or whole differential equations are solved simultaneously. These relations include, as a partial list, mechanical properties and responses obtained via equilibrium or dynamic load considerations, thermal properties and temperature distributions obtained via heat transfer methods, cell potential and concentrations of species and their transport properties, obtained via kinetic relations and/or fluid flow modeling, among others. Numerical methods including finite element models, difference methods, boundary element analysis, element-free Galerkin (EFG) or Smoothed Particle Hydrodynamics (SPH) methods may also be used. Some, but not all, of these methods employ meshes, or representations of surfaces and volumes, which are generated via a wide range of methodologies, could also be used. Post-processing of data generated in solution of multiphysics problems is described in general, but can be accomplished as a separate step, using any standard method of mining and presenting data.

The design of such batteries is also applicable to cases in which the battery is not the only power supply in the system, and additional power is provided by a fuel cell, other battery, IC engine or other combustion device, capacitor, solar cell, etc.

Figure 1:
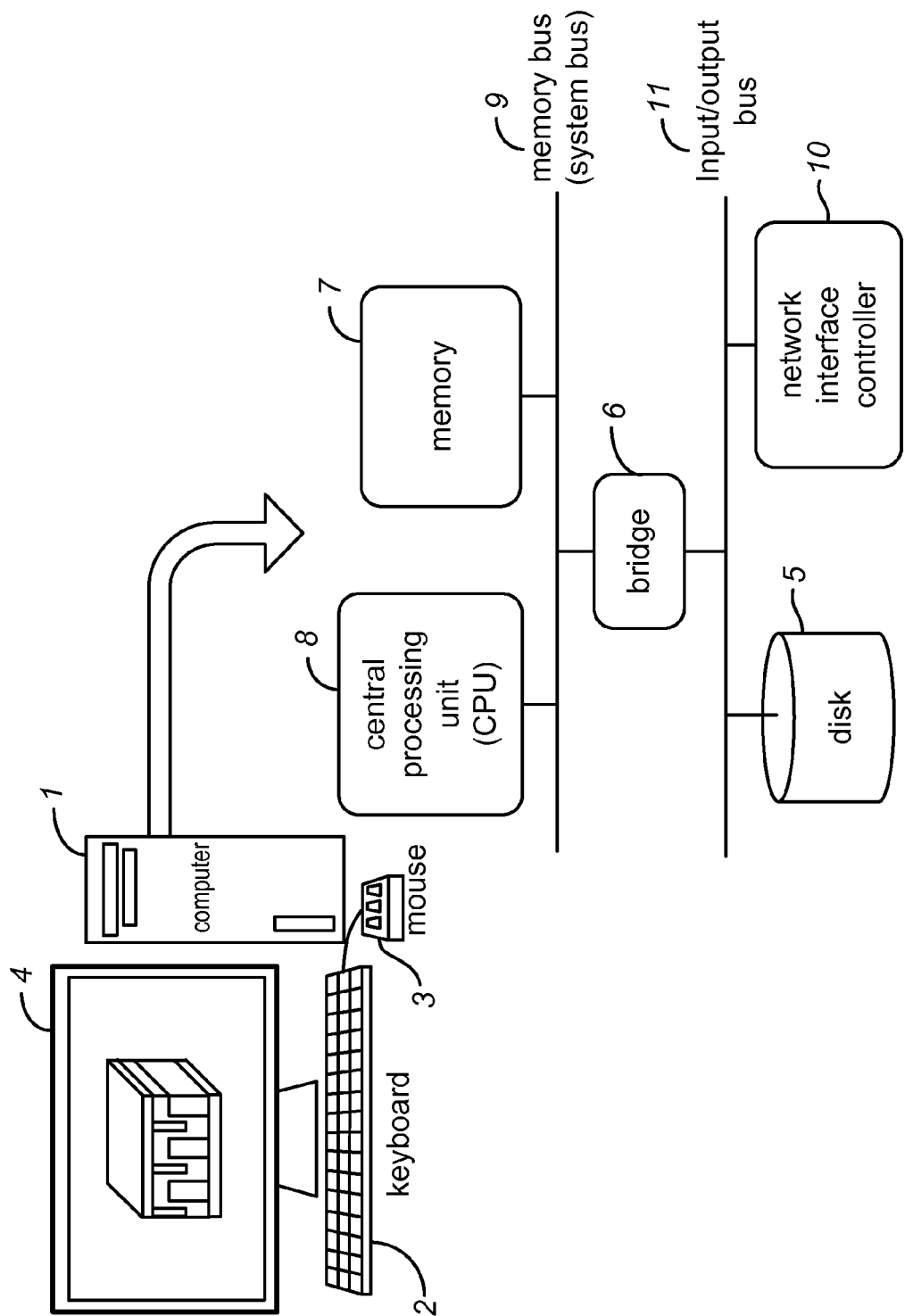
FIG. 1 is a simplified diagram of a computer aided system for designing a three-dimensional electrochemical cell according to an embodiment of the present invention.

FIG. 1 illustrates a computer system for computer-aided design for an electrochemical cell, wherein a computer 1, responds to inputs from keyboard 2, and/or other digitizing input device such as a light pen, or a mouse 3, and displays designs of the three-dimensional electrochemical cell on the graphical display device 4. This diagram is merely an illustration and should not unduly limit the scope of the claims herein. One of ordinary skill in the art would recognize many variations, modifications, and alternatives.

Commercially available, or in-house developed simulation programs and database are stored in the electronic storage device 5, which may be a magnetic disk or other type of digitized data storage device. As described throughout the present specification, a database is provided and used to gather electrochemical cell information and couple the electrochemical cell information to a three-dimensional simulation program. In a computer graphics aided design, morphologic information is displayed on the graphical display device 4. As a simple example, the three-dimensional electrochemical cell is shown, wherein anode, cathode, separators, and two current collectors are shown. Typically, a simulation program is loaded from the storage device 5, through the bridge unit 6, into the memory unit 7, as a whole. Then, the digitized rendering of the three-dimensional electrochemical cell is loaded either from the data storage device 5, or input devices 2 and 3. Data include geometric information and material properties. In a specific embodiment, the method obtains a conventional battery and reverse engineers it to determine the information, such as materials, configuration, geometry, and any and all other measurable parameters. Alternatively, the present method selects one or more materials and determines their properties, including extrinsic and intrinsic, according to a specific embodiment. Multiple programs are added to the base structure from the mass storage device 5 and then processed using device 8. These added programs include a meshing algorithm, a solver algorithm, a post-processing algorithm, and the like. The post-processed data then are sent back to the database structure, resulting in changes in database. Finally, the whole data structure and simulation programs are streamlined, and stored in the data storage device 5.

Figure 2:
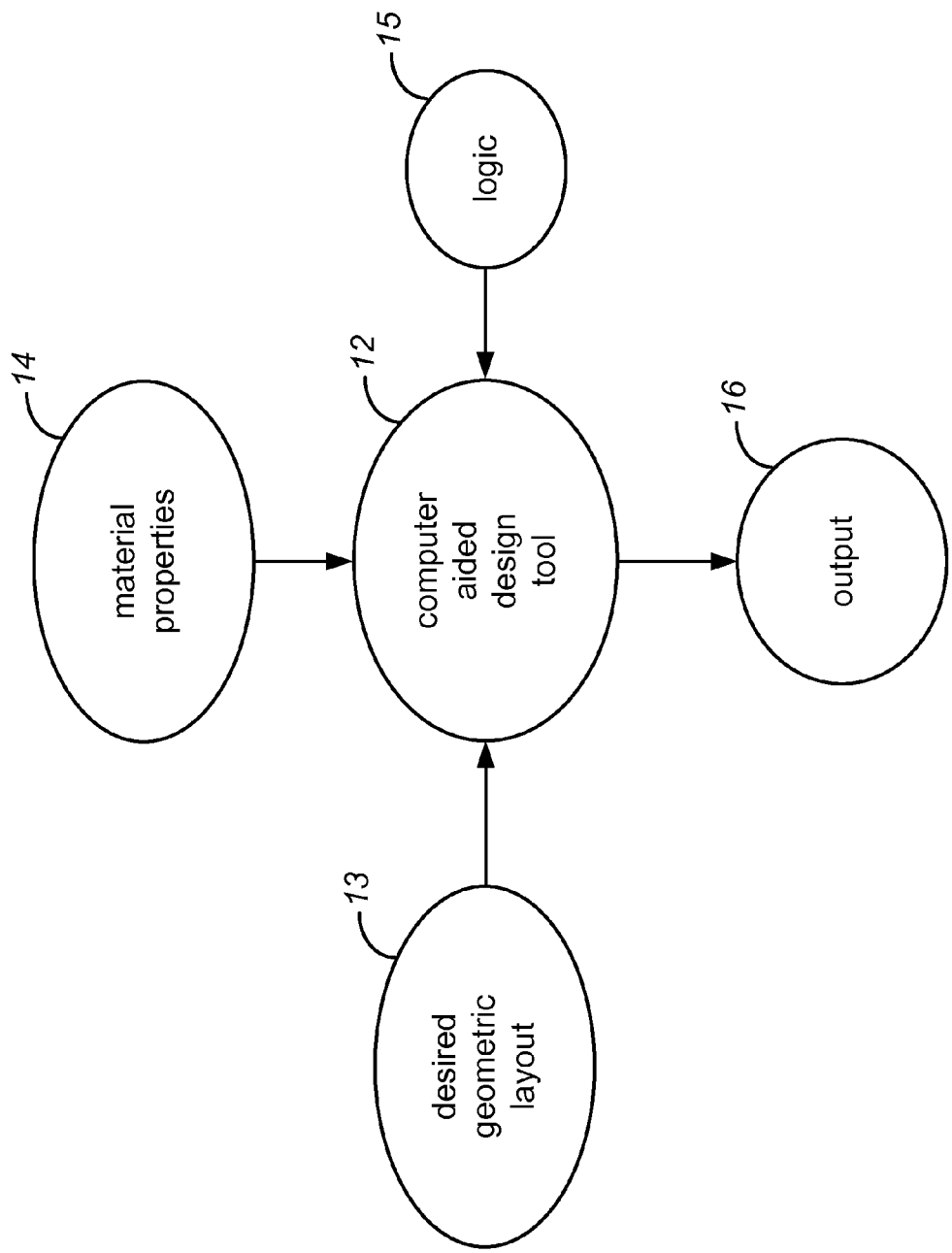
FIG. 2 is a simplified diagram of computer modules for the computer aided system for designing the three-dimensional electrochemical cell according to an embodiment of the present invention.

FIG. 2 depicts the tool 12 of the present invention regarding computer-aided design of a three-dimensional electrochemical cell, wherein all of the programs for generating the geometric layout, the logic, and solving required equations are integrated. This diagram is merely an illustration and should not unduly limit the scope of the claims herein. One of ordinary skill in the art would recognize many variations, modifications, and alternatives. The desired geometric layout 13, is generated from the database and is processed by the computer graphics program. The material properties 14 are input as part of the database structure. The logic 15, underlies the behavior of the materials. Then, the operation of the three-dimensional electrochemical cell is simulated based on the information gathered by this computer aided design tool, and is output to the database structure 16.

Figure 3:
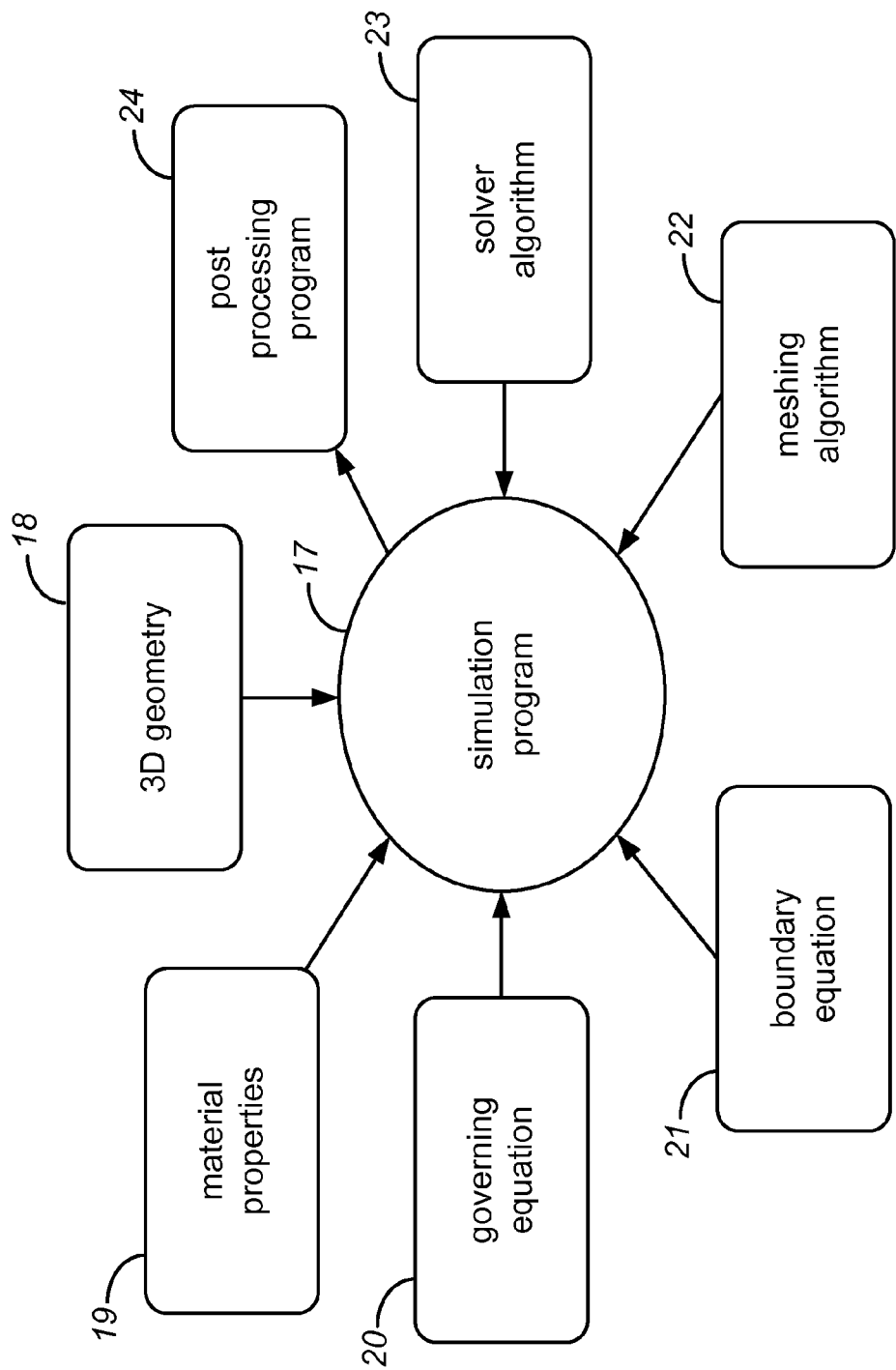
FIG. 3 is a simplified diagram of three dimensional processing module according to an embodiment of the present invention.

FIG. 3 illustrates the simulation program 17 used as an engine of the present invention. This diagram is merely an illustration and should not unduly limit the scope of the claims herein. One of ordinary skill in the art would recognize many variations, modifications, and alternatives. The program integrates the input data, the logic, meshing algorithm, solving algorithm, and the post-process algorithm together. This simulation program could be obtained commercially or built in-house. The input data includes the geometric information 18 and the material properties 19. The governing equations 20 and boundary equations 21 are chosen based on the underlying logic for the material behaviors. The meshing algorithm 22 chooses the order of the governing and boundary equations and provides the degree of the approximation to the real material behaviors. The solver algorithm 23 provides the efficiency and accuracy of the end results. The post-process algorithm 24 provides showing the computational results, and showing results in terms graphics', charts', or tables' forms.

Figure 4:
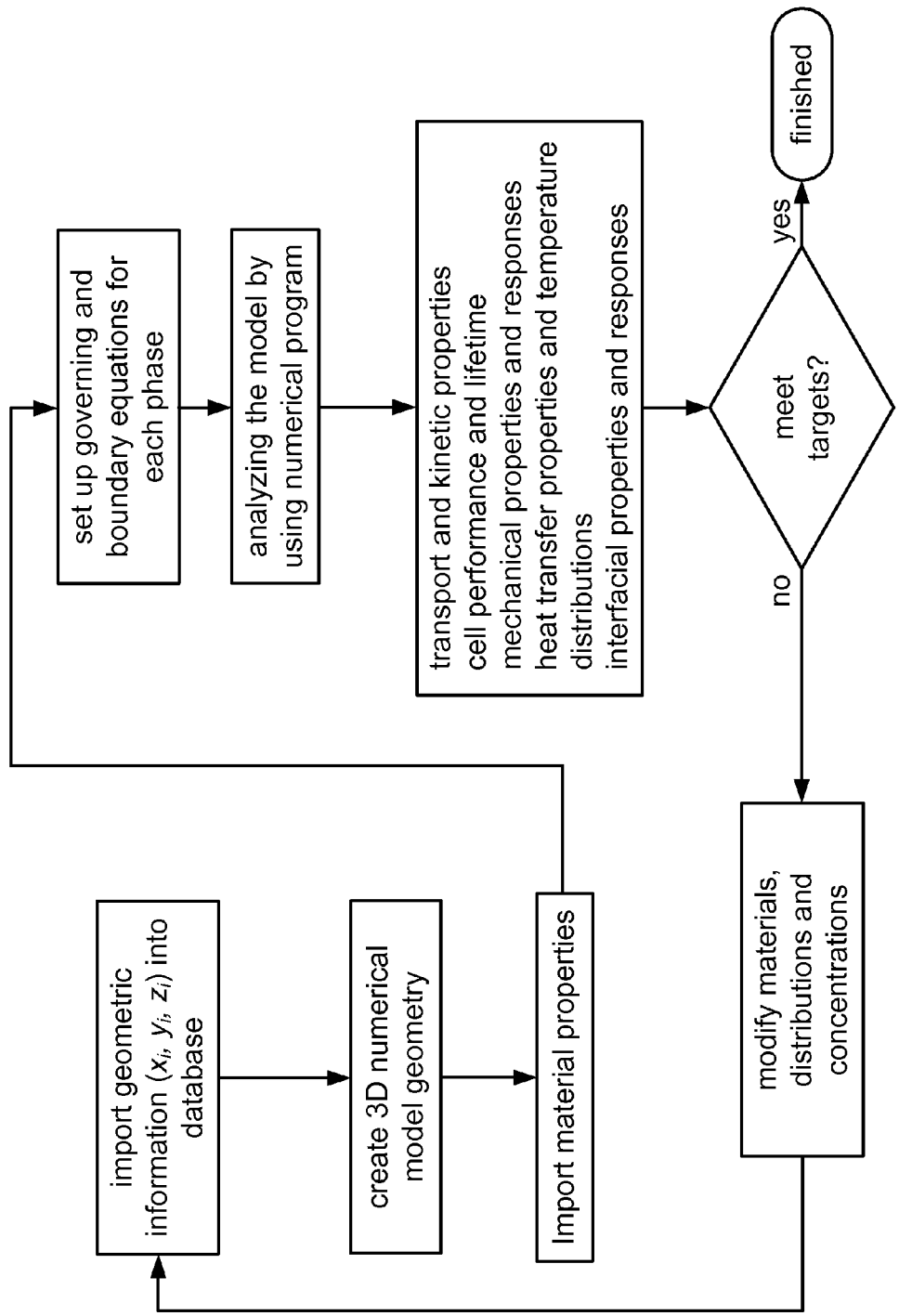
FIG. 4 is a simplified flow diagram of a method for designing an electrochemical cell according to an embodiment of the present invention.

In a specific application of the present invention, a systematic process for manufacturing a new electrochemical cell is made possible, as depicted in FIG. 4.
(1) The designer generates necessary geometric information of anode, cathode, separator, and current collectors as database structure. In the present invention, the electrode morphology is not limited into thin-film shape, but also includes any three-dimensional geometries or combination of three-dimensional geometries.
(2) The database is then loaded into the finite element method simulation program.
(3) The designer inputs the material properties into the database structure.
(4) The designer selects the proper governing equations and boundary equations to interpret the behavior of the involving materials, such as the anode, cathode, electrolyte, separator, and current collectors.
(5) The finite element method simulation program gathers the structural database regarding the geometric and material information, governing and boundary equations, and solver algorithm to obtain the operational performance parameters.
(6) These operational performance parameters include effective electronic conductivity of electrode, effective ionic conductivity of electrolyte, cell voltage performance, intercalation stress, and temperature distribution. The information will be stored in the database structure.
(7) The designer then compares the simulation results and the desired performance parameters. If the errors between simulated results and desired performance parameters are within acceptable tolerances, the simulated setup of the three-dimensional electrochemical cell is accepted. If the errors are not within the acceptable tolerances, the design of the three-dimensional electrochemical cell is systematically changed and the design process (1) to (7) is repeated until errors are within the acceptable tolerance.

Figure 5:
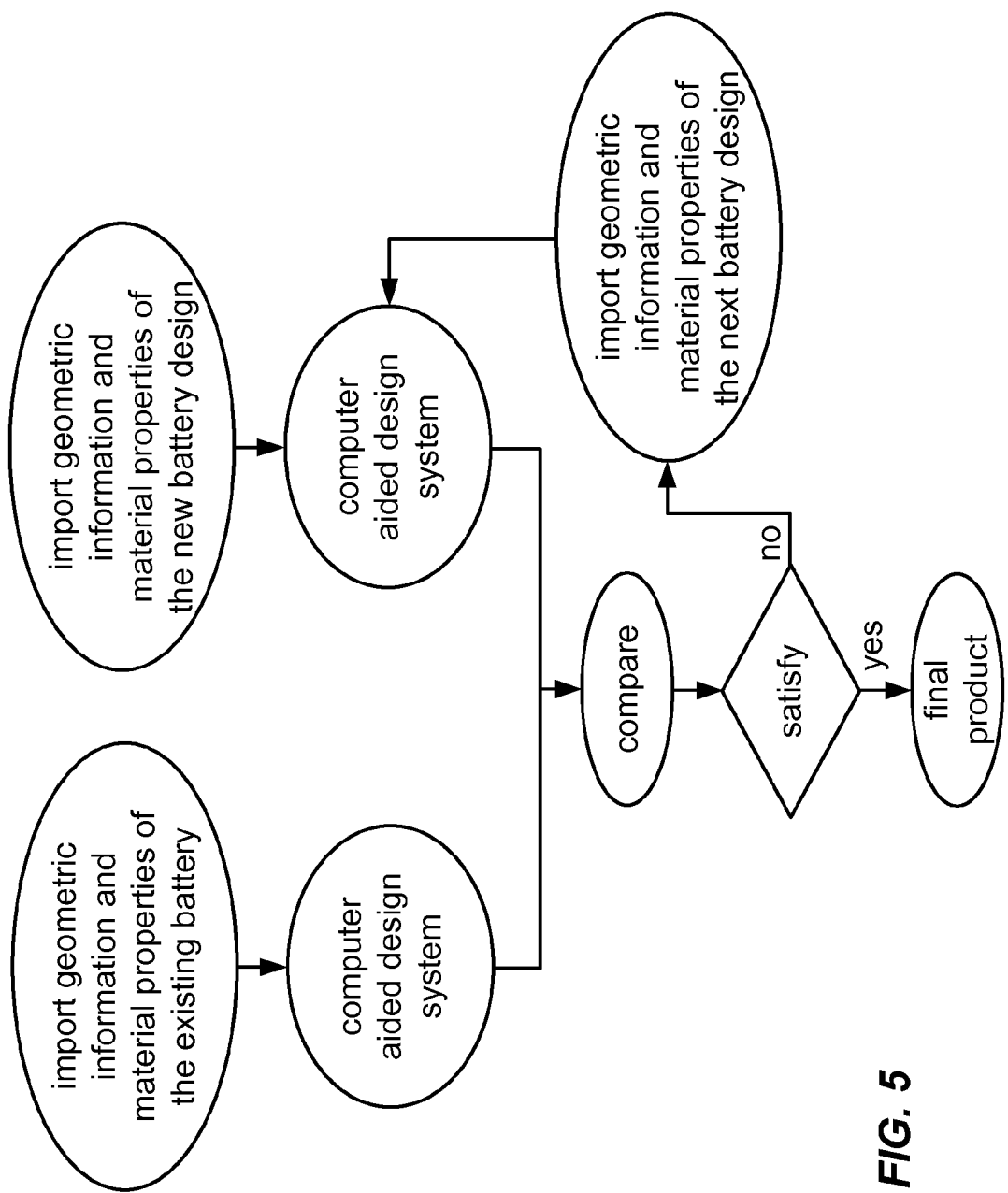
FIG. 5 is a simplified flow diagram of the a method for modifying existing electrochemical cell according to one or more embodiments of the present invention.

In another application with present invention, an existing electrochemical cell design is modified, as depicted in FIG. 5.
1) The designer generates the geometric and material properties information for the anode, cathode, separator, and current collectors for entry into the database structure for the existing electrochemical cell design.
2) The database is then loaded into the computer aided design tool depicted in FIG. 2 to simulate the electrochemical cell performance for the existing design.
3) In parallel, the designer generates the geometric and material properties information of anode, cathode, separator, and current collectors as the database structure for the modified electrochemical cell design.
4) The database is then loaded into the computer aided design tool depicted in FIG. 2, to simulate the electrochemical cell performance for the modified design.
5) Then, the designer compares the two cell performances obtained from process 2) and 4) to determine whether the modified design is acceptable.
6) If the performance of the modified design is acceptable, the final product is built based on the modified design.
7) If the performance of the modified design is unacceptable, the designer systematically repeats processes 3) to 7) until the cell performance is acceptable.

Example 1

Design and Method of an Electrochemical Cell

Figure 6A:
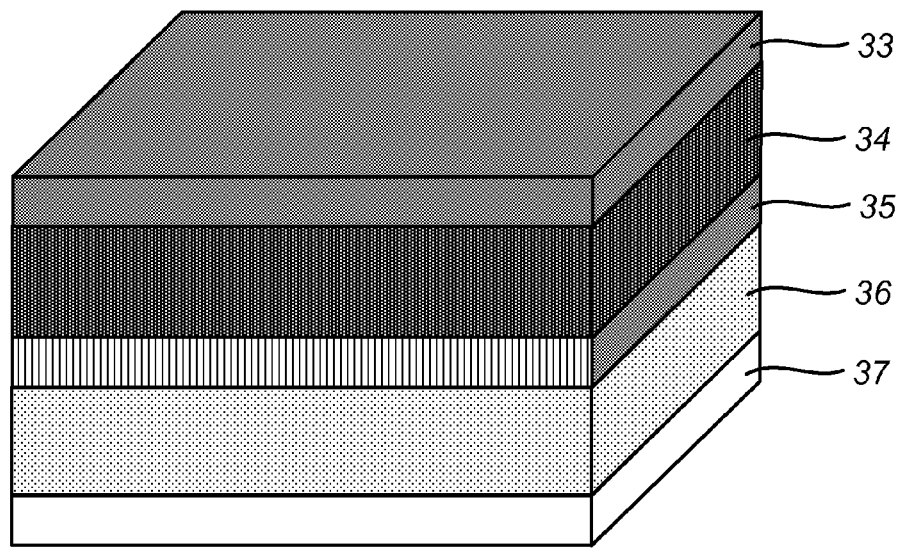
FIG. 6A illustrates a cathode with thin-film design according to an embodiment of the present invention.
Figure 6B:
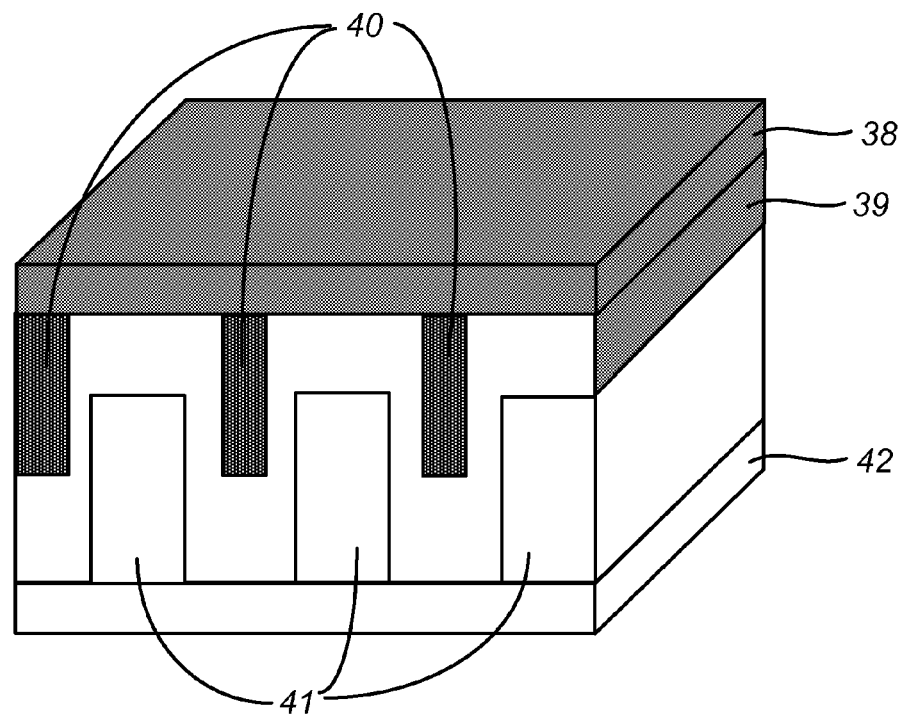
FIG. 6B illustrates a cathode with column design according to an embodiment of the present invention.
Figure 6C:
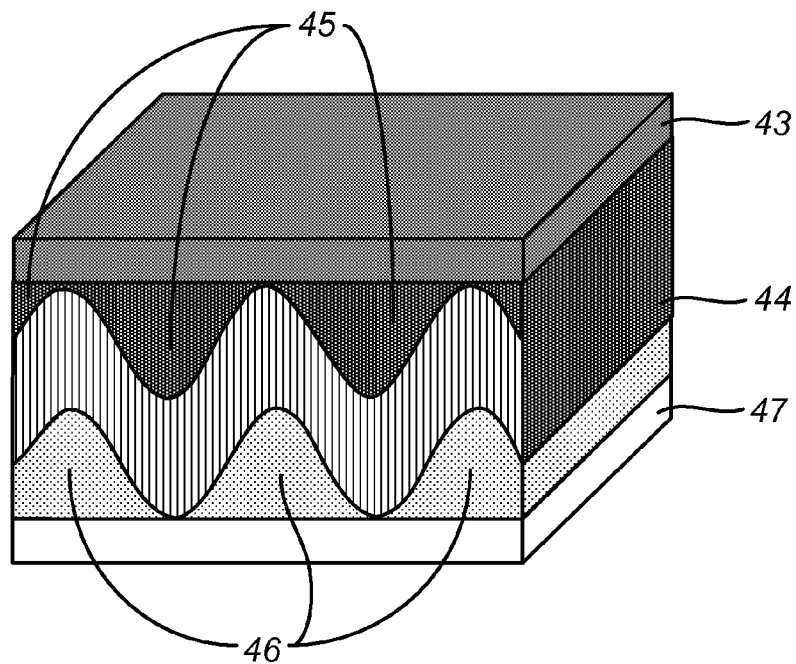
FIG. 6C illustrates a cathode with sinusoidal design according to an embodiment of the present invention.

This example demonstrates the process of manufacturing a new electrochemical cell with the optimal morphological shape of the electrode. As an example of the problems encountered by the designer, three different morphological designs of three-dimensional electrodes are provided: thin-film in FIG. 6A, columnar shape in FIG. 6B, and a sinusoidal shape in FIG. 6C. The materials for the three-dimensional electrochemical cells are copper as anode current collector (33 in FIG. 6A, 38 in FIG. 6B, 43 in FIG. 6C), lithium metal as anode (34 in FIG. 6A, 40 in FIG. 6B, 45 in FIG. 6C), lithium manganese oxide as cathode (36 in FIG. 6A, 41 in FIG. 6B, 46 in FIG. 6C), polymer with lithium salts as the electrolyte (35 in FIG. 6A, 39 in FIG. 6B, 44 in FIG. 6C), and aluminum as cathode current collector (37 in FIG. 6A, 42 in FIG. 6B, 47 in FIG. 6C). Because a polymer electrolyte is used, a separator is unnecessary. These materials used here are for illustrative purposes, but are not limited by these materials. The volume of the three different design electrodes are constraints. Designers using conventional systems would often go into the laboratory and build these three different designs of cathode, assemble them into real cells, and test them for a period of time to obtain the performance parameters.

Designer can obtain the performance parameters by using one or more embodiments of the present invention more efficiently. It could identify two important factors that will affect the rate performance, durability, and life of the electrochemical cell. The first factor is the sharp corner of the column shape of electrode. As in this example, the maximum intercalation induced stress of column shape design is about four times larger than the thin-film design. The other factor is the surface-to-volume ratio of the cathode. It is believed that sharp corner will intensify the stress, which will result in short life and low durability. On the other hand, the small surface-to-volume ratio will result in low charge/discharge rate capability. As in this example, the maximum achievable capacity under 1 C rate, which regulates the discharge current so that ideally the whole capacity of the cell will be exhausted within one hour, for the thin-film design is about 73% of the column shape design. Hence, the sinusoidal design is the optimal design in this case.

Example 2

Modifying an Existing Electrochemical Cell

Figure 7A:
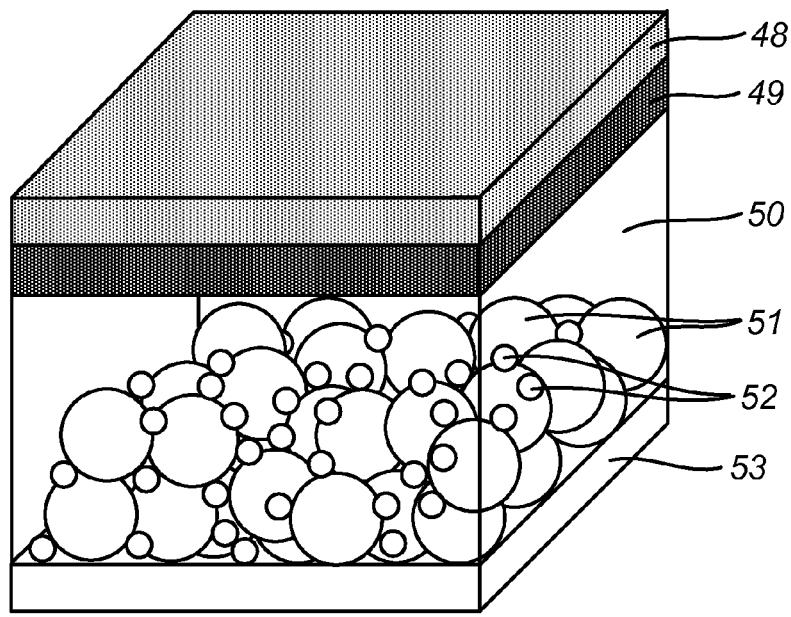
FIG. 7A illustrates a cathode of an existing three-dimensional electrochemical cell with larger particle size than newer design one according to an embodiment of the present invention.
Figure 7B:
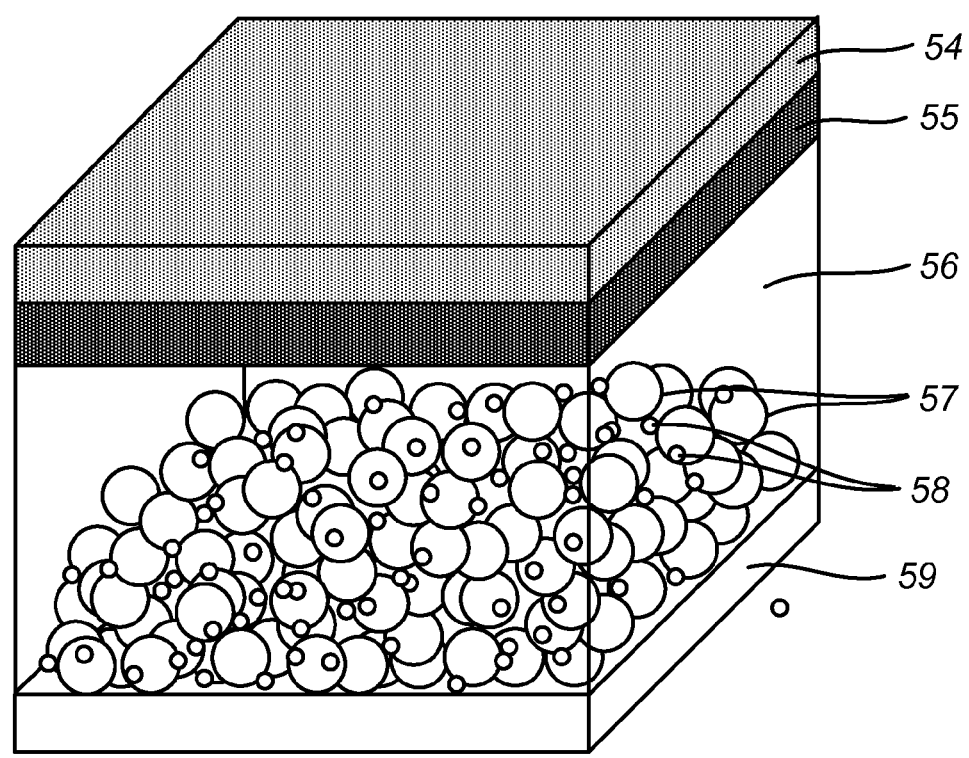
FIG. 7B illustrates a cathode of a newer design of three-dimensional electrochemical cell with smaller particle size than the existing cell according to an embodiment of the present invention.

This example demonstrates the process of modifying existing electrochemical cell to improve cell performance. As an example encountered by a designer, the rate performance of existing electrochemical cell is not satisfied, and the existing electrochemical cell has the design as shown in FIG. 7A. In this existing electrochemical cell, the anode current collector 48 is copper, the anode 49 is lithium metal, the electrolyte 50 is polymer with lithium salt, the cathode is comprised of mixture of lithium manganese oxide particles 51 served as the active material, carbon black particles 52 served as the conductive additives, and the binder coated around all the particles, and finally the cathode current collector 53 is aluminum. The designer attempts to improve the rate performance by decreasing the size of the particles of cathode 57 and 58 as shown in FIG. 7B. A designer using a conventional design process would have to go into the laboratory to build a few real cells with slight changes of particle sizes of lithium manganese oxide and carbon black. There are several issues they might face with this strategy. First, it would be doubtful that the origin of the performance changes of the new design was really due to the changes on design or just due to manufacturing error. Second, the economic and environmental losses are larger with this practice, because it would waste a lot of materials. Third, the optimal size of the cathode particles might be overlooked because the designer might not even test right combinations. Fourth, it is time-consuming. With one or more embodiments, the present computer aided design process could provide the outcome of the modified cell and eliminate human error. It will reduce the cost in terms of financially and environmentally, because he/she would only need to be in front of computer and obtain the results within few hours before making it.

Figure 8A:
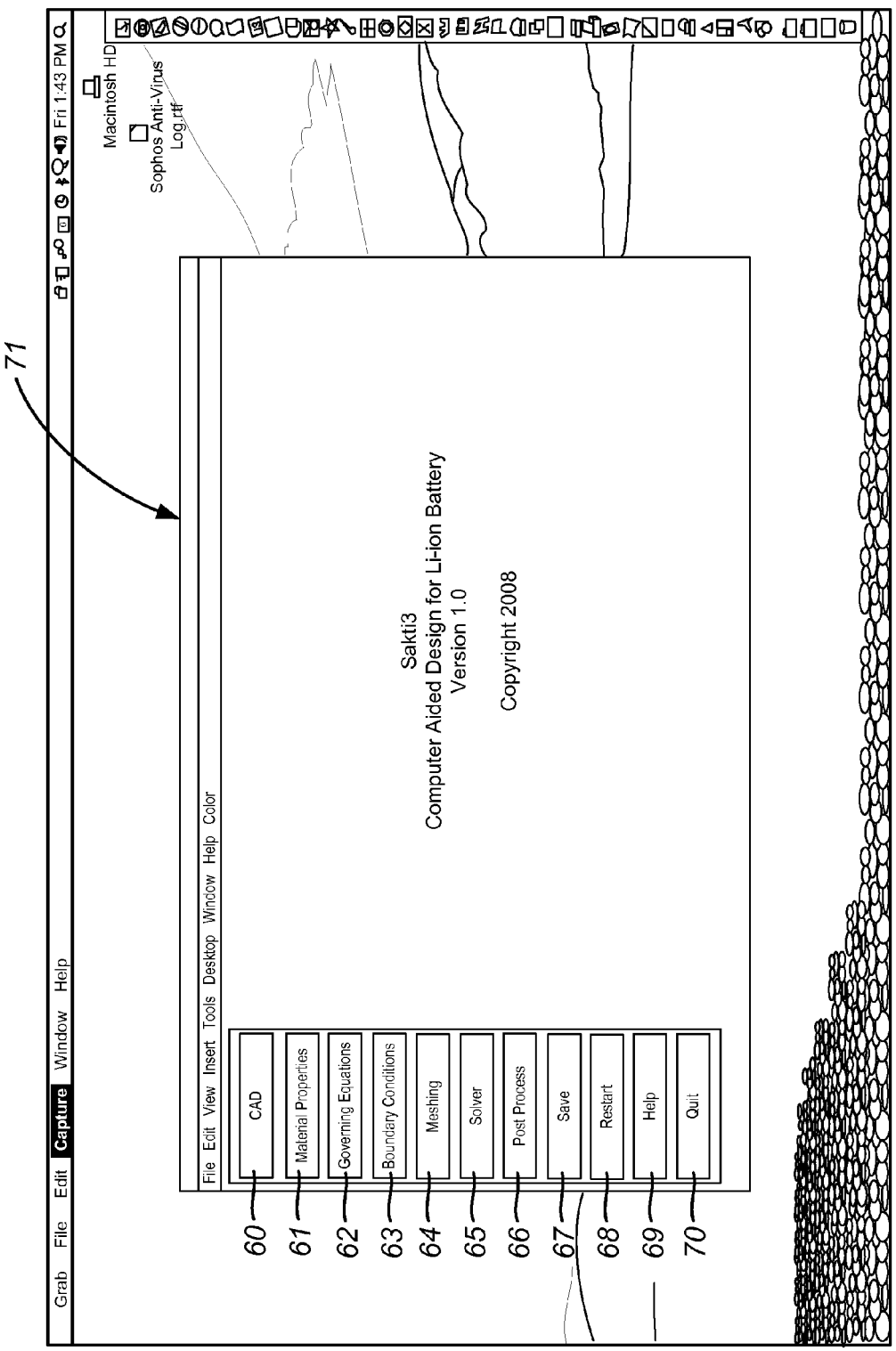
FIG. 8A illustrates an interface of computer aided design process according to an embodiment of the present invention.
Figure 8B:
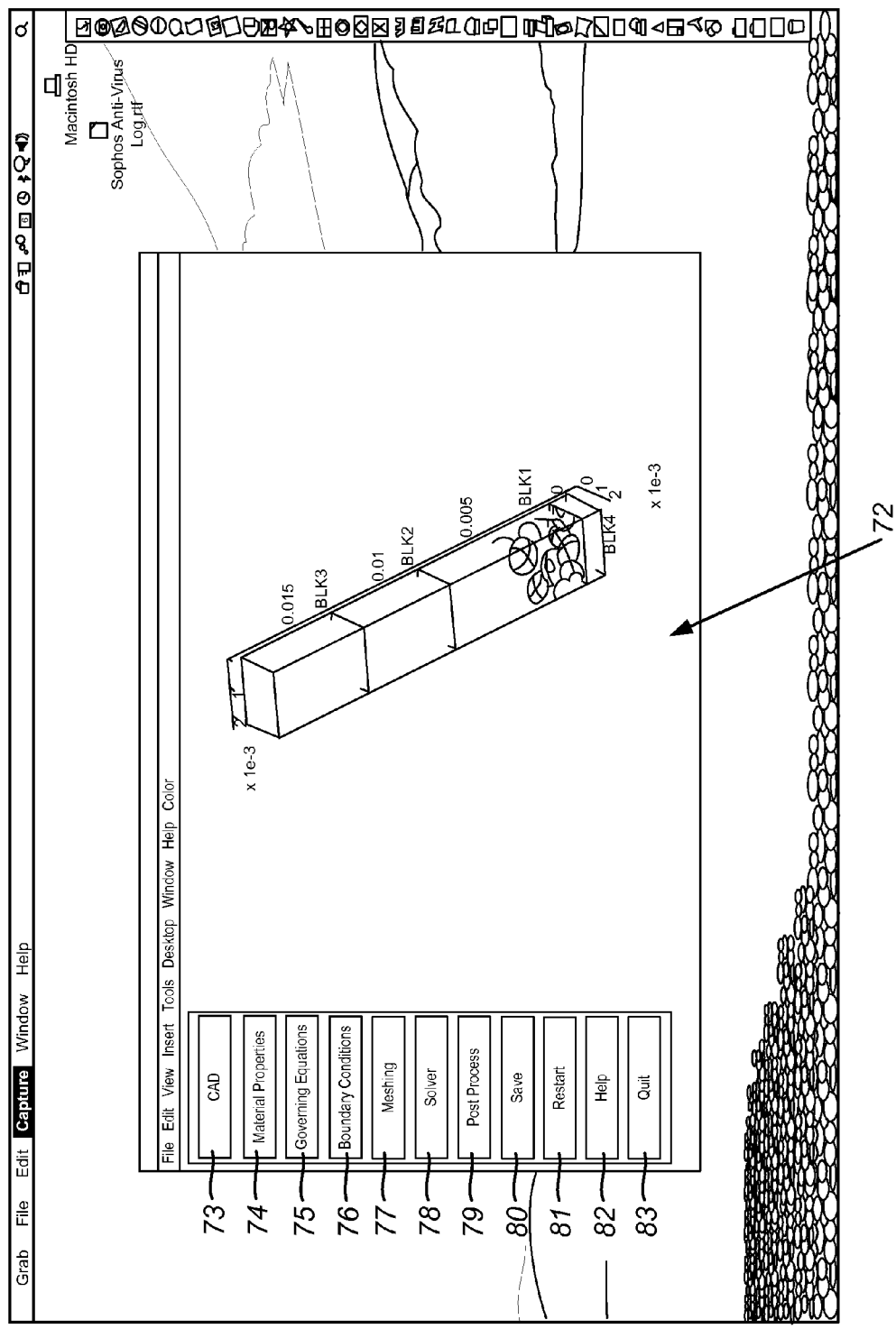
FIG. 8B illustrates electrochemical cell geometry according to an embodiment of the present invention.
Figure 8C:
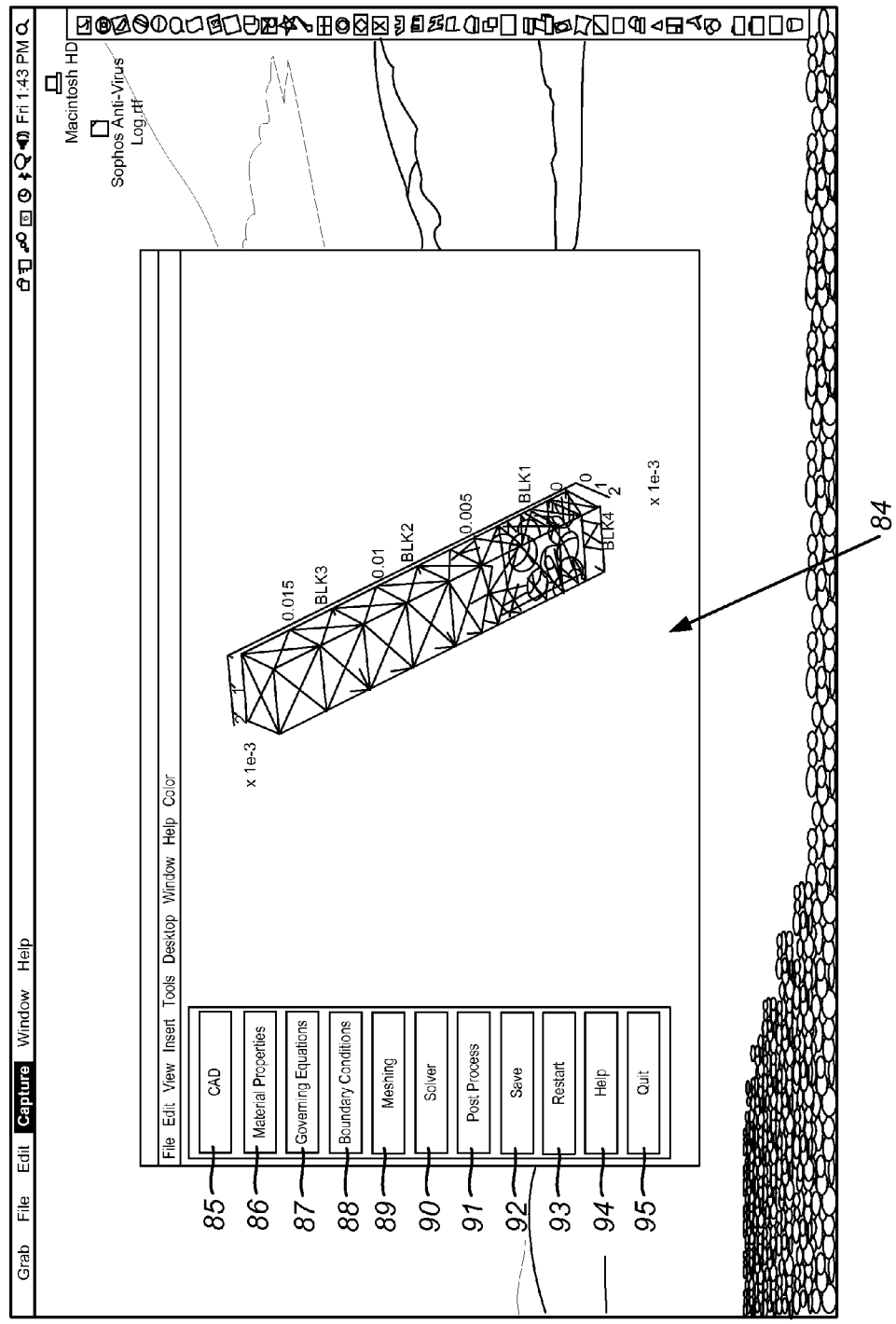
FIG. 8C illustrates meshes of an electrochemical cell according to an embodiment of the present invention.
Figure 8D:
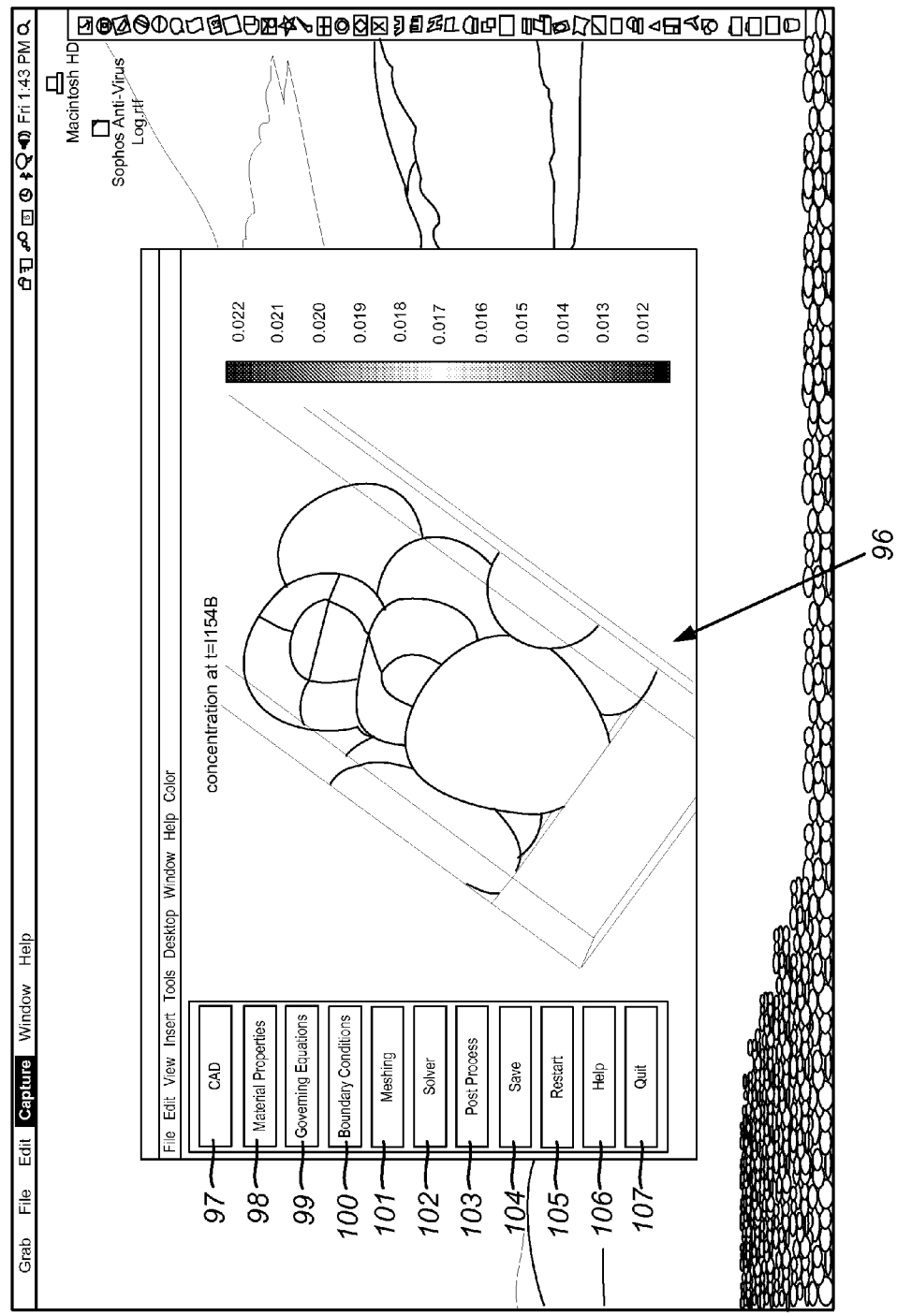
FIG. 8D illustrates a contour of lithium concentration at time of 11548 seconds of an electrochemical cell according to an embodiment of the present invention.

With the process shown in FIG. 5, the designer will generate two sets of database structure for the existing and newer design of electrochemical cells. Then, present computer-aided design process (as 60-70 in FIG. 8A), which has been integrated as (71) in FIG. 8A, will simulate the database structure and output the outcome of the two designs. The designer will collect the particle size and volume fraction based on the image analysis techniques or from the original design database to generate the geometry of the cell as (72) in FIG. 8B by clicking on "CAD" button (60 in FIG. 8A). Then, the designer inputs the material properties by clicking on "Material Properties" button (61 in FIG. 8A), and the inputs the governing equations and boundary conditions for intended cell behaviors by clicking on "Governing Equations" and "Boundary Conditions" buttons (62 and 63 in FIG. 8A), respectively. Then, the meshes will be generated as shown (84 in FIG. 8C) by clicking on "Meshing" button. Next, the designer will chose the solver to solve the results by clicking on "Solver" button (as 90 in FIG. 8C). Final results can be presented in terms of the table or contours as shown 96 in FIG. 8D by clicking on 91 in FIG. 8C. The designer then compares the two performance parameters. If the outcome of the new design is satisfied with the target performance characteristic, the final electrochemical cell will be manufactured by the newer design. If it is not satisfied, the designer could modify the new design with new idea repeatedly with the same process until the performance parameters is satisfied. Again, any of the diagrams herein are merely illustrations and should not unduly limit the scope of the claims herein. One of ordinary skill in the art would recognize many variations, modifications, and alternatives.

Figure 9:
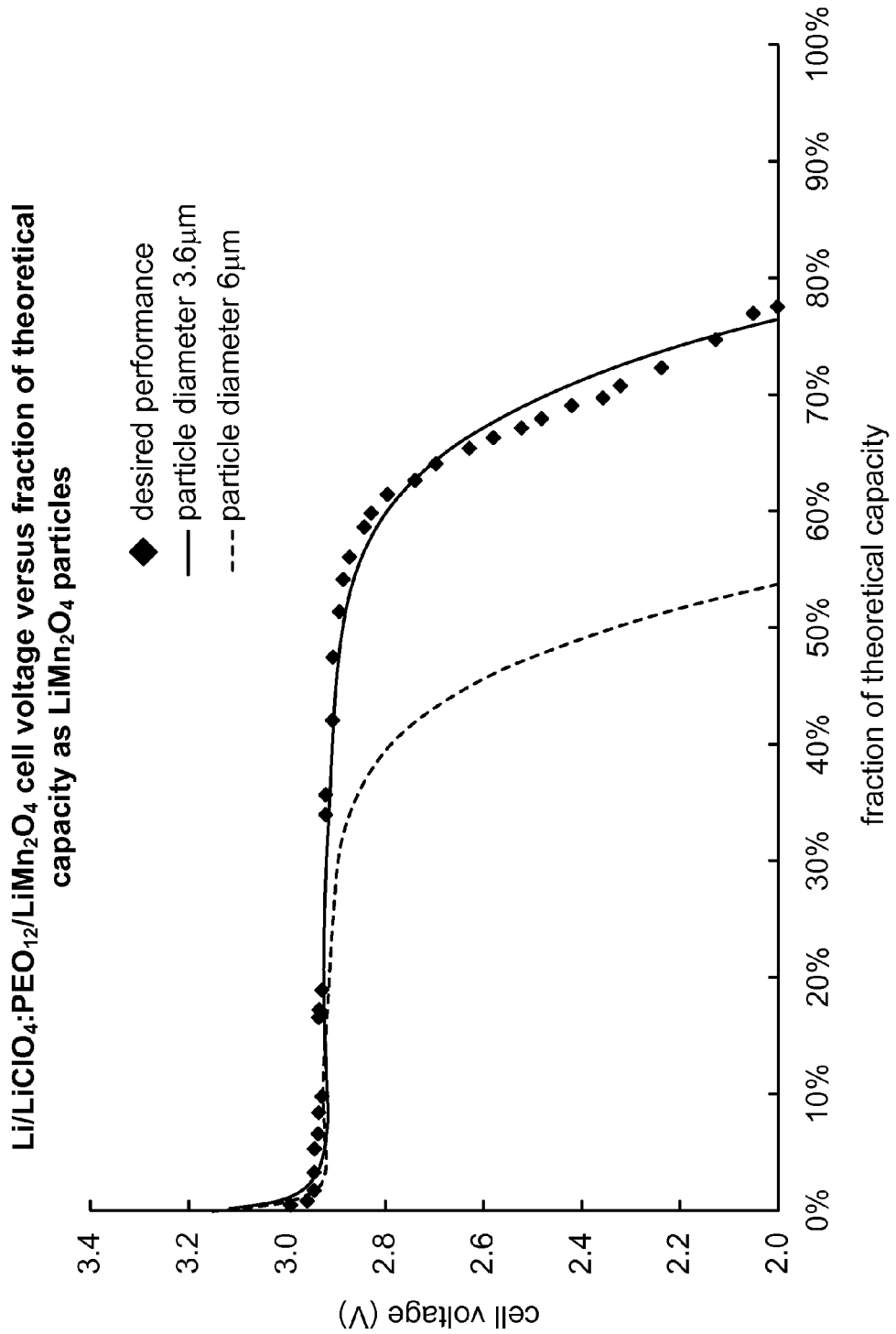
FIG. 9 plots cell voltage versus fraction of theoretical capacity, of two Li ion cells ($Cu/Li/LiClO_4$-$PEO/Li_{1+x}Mn_2O_4/Al$) in terms of degree of Li-ion intercalation in $Li_{1+x}Mn_2O_4$. The cathode particles are two different sizes (3.6 μm vs 6 μm) according to an embodiment of the present invention.

FIG. 9 illustrates cell voltages of two Li ion cells (Cu/Li/LiClO$_4$-PEO/Li$_{1+x}$Mn$_2$O$_4$/Al), in terms of degree of Li-ion intercalation in Li$_{1+x}$Mn$_2$O$_4$. The cathode particles are two different sizes (3.6 μm vs 6 μm) according to a particular embodiment of the present invention;

The result shown in FIG. 9 demonstrates that the achievable capacity of lithium polymer cell can be increased from 64% to 77% of theoretical capacity of cell by decreasing the particle size from 6 μm to 3.6 μm when the cells are discharged for 10 hours. The materials for the three-dimensional electrochemical cells are copper as anode current collector (48 in FIG. 7A, 54 in FIG. 7B), lithium metal as anode (49 in FIG. 7A, 55 in FIG. 7B), LiClO4 and PEO as polymer electrolyte (50 in FIG. 7A, 56 in FIG. 7B), lithium manganese oxide (51 in FIG. 7A, 57 in FIG. 7B) mixed with carbon black (52 in FIG. 7A, 58 in FIG. 7B) with volume ratio of (19:1), and aluminum as cathode current collector (53 in FIG. 7A, 59 in FIG. 7B). Because a polymer electrolyte is used, a separator is unnecessary. These materials and composition used here are for illustrative purposes, but are not limited by these materials. The volume of the total cathode of two different design electrodes is a constraint. The diamond (♦) indicated the desired cell performance as the cell discharged for 10 hours. As in this example, the outcome of particle size of 3.6 μm meets the desired performance characteristics. Hence, the particle size 3.6 μm is the optimal design in this example.

Any of the above sequence of steps provides a method according to an embodiment of the present invention. In a specific embodiment, the present invention provides a method and system for designing an electrochemical cell in three dimensions. Other alternatives can also be provided where steps are added, one or more steps are removed, or one or more steps are provided in a different sequence without departing from the scope of the claims herein.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for designing a three-dimensional battery device using computer generated design information and using the computer generated design information to manufacture the battery device, the battery device comprising an anode, cathode, separator, electrolyte, and current collectors, wherein the electrolyte comprises the separator, the method comprising:

providing computer generated relationship between one or more first characteristics referenced against one or more second characteristics for a selected material set for design of three dimensional spatial elements in a three-dimensional electrochemical cell of the battery device, the computer generated relationship including a numerical method using a plurality of partial differential relationships representative of a behavior of the three dimensional battery device including the anode, cathode, separator, electrolyte, and current collectors, wherein the electrolyte comprises the separator;

selecting one or more of the first or second characteristics for the selected material set;

processing the one or more selected first or second characteristics to determine whether the one or more first or second characteristics is within one or more predetermined performance parameters;

using the one or more first or second characteristics to design of the three dimensional electrochemical cell having one or more particle feature sizes of less than 100 microns; and manufacturing the battery using the one or more first or second characteristics, wherein the one or more first characteristics comprise electrical, thermal, mechanical, transport, or kinetic characteristics;

wherein the numerical method is at least one process selected from a finite element method, a finite difference method, a boundary element analysis, an element-free Galerkin (EFG) method, or a Smoothed Particle Hydrodynamics (SPH) method; and wherein the computer generated design information comprising an anode geometry, a cathode geometry, a separator geometry, and one or more current collector geometries.

2. The method of claim 1 wherein the one or more second characteristics comprise particle size, particle spacing, volume fraction, density, composition of cathode/anode/separator/current collector/electrolyte, interfacial interaction of electrolyte/anode or electrolyte/cathode, shape of the cathode/anode/separator/electrolyte, or type of materials; wherein the electrolyte comprises the separator.

3. The method of claim 1 wherein the performance parameters comprises at least one parameter selected from lifetime, safety/mechanical/kinetic, thermal, ion concentration, voltage profile, degree of intercalation, degree of achievable capacity under various discharge rate or discharge profile, intercalation-induced stresses, or volume changes.

4. The method of claim 1 wherein the three dimensional electrochemical cell is selected from a structured pair of electrodes, a graded electrode configuration, packed particle structure, porous structure, or any combination of these.

5. A method for analyzing a three-dimensional electrochemical system comprising an anode, cathode, separator, electrolyte, and current collectors for a battery device, the method comprising:

generating spatial information including an anode geometry, a cathode geometry, a separator geometry, and one or more current collector geometries;

using a numerical method to process one or more relationships, the one or more relationships being one or more coupled or decoupled, continuous, discretized, or piecewise continuous, partial or whole differential equations or other logical forms, the numerical method representative of a behavior of the three dimensional battery device comprising the anode, cathode, separator, electrolyte, and current collectors; and wherein the electrolyte comprises the separator;

determining one or more first or second characteristics in a first three-dimensional electrochemical cell from a first battery device;

generating a relationship between the one or more first characteristics referenced against the one or more of the second characteristics;

processing the one or more selected first or second characteristics to determine whether the one or more first or second characteristics is within predetermined performance parameters;

using the one or more first or second characteristics for a second three dimensional electrochemical cell having one or more particle feature sizes of less than 100 microns for a second battery device; and manufacturing the second battery device using at least the one or more second characterisitics;

wherein the one or more first characteristics comprise electrical, thermal, mechanical, transport, and kinetic characteristics;

wherein the numerical method is at least one process selected from a finite element method, a finite difference method, a boundary element analysis, an element-free Galerkin (EFG) method, or a Smoothed Particle Hydrodynamics (SPH) method.

6. The method of claim 5 wherein the numerical method is used for analysis of multiphysics problems in which the partial or whole differential equations are solved simultaneously.

7. The method of claim 5 wherein the numerical method employs meshes or representations of surfaces and volumes.

8. The method of claim 3 wherein the relationships include:
mechanical properties and responses obtained via equilibrium or dynamic load considerations,
thermal properties and temperature distributions obtained via heat transfer methods, or
cell potential and concentrations of species and their transport properties, obtained via kinetic relations and/or fluid flow modeling.

9. The method of claim 5 wherein the one or more second characteristics comprises particle size, particle spacing, volume fraction, density, composition of cathode/anode/separator/current collector/electrolyte, interfacial interaction of electrolyte/anode or electrolyte/cathode, and shape of the cathode/anode/separator/electrolyte.

10. The method of claim 5 wherein the performance parameters comprises lifetime, safety/mechanical/kinetic, thermal, ion concentration, voltage profile, degree of intercalation, degree of achievable capacity under various discharge rate or discharge profile, intercalation-induced stresses, and volume changes.

11. The method of claim 5 wherein the three dimensional electrochemical cell is selected from a structured pair of electrodes, a graded electrode configuration, packed particle structure, porous structure, or any combination of these.

12. A computer-aided system for processing information related to a three-dimensional battery device comprising an anode, cathode, separator, electrolyte, and current collectors for the battery device, the system comprising one or more computer readable memory, the one or more computer readable memory comprising:

one or more computer codes for outputting a computer generated relationship between one or more first characteristics referenced against one or more second characteristics for a selected material set for a design of three dimensional spatial elements in a three-dimensional electrochemical cell for the battery device, the computer generated relationship including a numerical method using a plurality of partial differential relationships representative of a behavior of the three dimensional battery device including the anode, cathode, separator, electrolyte, and current collectors; and wherein the electrolyte comprises the separator, and the three dimensional spatial elements including an anode geometry, a cathode geometry, a separator geometry, and one or more current collector geometries;

one or more codes directed to selecting one or more of the first characteristics or second characteristics for the selected material set;

one or more codes directed to processing the one or more selected first or second characteristics to determine whether the one or more first or second characteristics is within one or more predetermined performance parameters; and one or more codes directed to executing a program for processing the one or more first characteristics or second characteristics to provide the three dimensional electrochemical cell having one or more particle feature sizes of less than 100 microns for the battery device;

wherein the one or more first characteristics comprise electrical, thermal, mechanical, transport, or kinetic characteristics; and wherein the numerical method is at least one process selected from a finite element method, a finite difference method, a boundary element analysis, an element-free Galerkin (EFG) method, or a Smoothed Particle Hydrodynamics (SPH) method.

13. The system of claim 12 further comprising one or more codes directed to a post processing program.

14. The system of claim 12 further comprising one or more codes directed to a meshing program.

15. The system of claim 12 further comprising one or more codes directed to one or more boundary conditions.

16. The system of claim 12 further comprising one or more codes directed to one or more irregular shaped objects, the one or more irregular shaped objects associated with one or more of the second characteristics.

* * * * *

UNITED STATES PATENT AND TRADEMARK OFFICE
CERTIFICATE OF CORRECTION

PATENT NO. : 7,945,344 B2
APPLICATION NO. : 12/484959
DATED : May 17, 2011
INVENTOR(S) : Chia-Wei Wang et al.

Page 1 of 1

It is certified that error appears in the above-identified patent and that said Letters Patent is hereby corrected as shown below:

Title page, item (73) Assignee: should read as follows: Sakti3, Inc. instead of Sakt13, Inc.

Signed and Sealed this
Tenth Day of April, 2012

David J. Kappos
*Director of the United States Patent and Trademark Office*